United States Patent
Liu et al.

(10) Patent No.: US 11,223,197 B2
(45) Date of Patent: Jan. 11, 2022

(54) OVERCURRENT PROTECTIVE CIRCUIT AND DISPLAY PANEL

(71) Applicant: TCL CHINA STAR OPTOELECTRONICS TECHNOLOGY CO., LTD., Guangdong (CN)

(72) Inventors: Yujia Liu, Guangdong (CN); Xianming Zhang, Guangdong (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 187 days.

(21) Appl. No.: 16/621,709

(22) PCT Filed: Jul. 4, 2019

(86) PCT No.: PCT/CN2019/094680
§ 371 (c)(1),
(2) Date: Dec. 12, 2019

(87) PCT Pub. No.: WO2020/220467
PCT Pub. Date: Nov. 5, 2020

(65) Prior Publication Data
US 2021/0328424 A1    Oct. 21, 2021

(30) Foreign Application Priority Data
Apr. 28, 2019 (CN) .......................... 201910349093.1

(51) Int. Cl.
*H02M 1/32* (2007.01)
*H02H 9/02* (2006.01)
*G02F 1/1362* (2006.01)

(52) U.S. Cl.
CPC ....... *H02H 9/025* (2013.01); *G02F 1/136204* (2013.01); *G02F 2202/22* (2013.01)

(58) Field of Classification Search
CPC .............. H02H 9/025; G02F 1/136204; G02F 2202/22; H02M 1/08; H02M 1/32; H02M 3/156; H03K 17/0822
See application file for complete search history.

(56) References Cited

U.S. PATENT DOCUMENTS 5,974,436 A * 10/1999 Inoue .................... G06F 7/5525
                                                        708/606
9,825,540 B2    11/2017 Yabuzaki
(Continued)

FOREIGN PATENT DOCUMENTS

| CN | 103683900 | 3/2014 |
|---|---|---|
| CN | 108233824 | 6/2018 |
| JP | 11027875 A * | 1/1999 |

*Primary Examiner* — Hoan C Nguyen
(74) *Attorney, Agent, or Firm* — Soroker Agmon Nordman

(57) ABSTRACT

The present disclosure proposes an overcurrent protective circuit and a display panel. The overcurrent protective circuit includes a power supply circuit, a logic algorithm circuit, and an overcurrent protective circuit. The logic algorithm circuit is additionally arranged in the overcurrent protective circuit. The logic algorithm circuit set different threshold currents of overcurrent protection for the display panel according on different driving frequencies. The overcurrent protective circuit adjusts the protective components inside the overcurrent protective circuit in accordance with the set threshold currents. Therefore, the display panel is protected by the overcurrent protective circuit at different frequencies.

20 Claims, 2 Drawing Sheets

(56) References Cited

U.S. PATENT DOCUMENTS

| | | | | |
|---|---|---|---|---|
| 2004/0158598 | A1* | 8/2004 | Hong | G06F 7/724 |
| | | | | 708/492 |
| 2005/0004966 | A1* | 1/2005 | Fan | G06F 7/724 |
| | | | | 708/492 |
| 2005/0229054 | A1* | 10/2005 | von Campenhausen | |
| | | | | G01R 31/3016 |
| | | | | 714/724 |
| 2009/0006509 | A1* | 1/2009 | Amin | G06F 7/52 |
| | | | | 708/200 |
| 2014/0036556 | A1* | 2/2014 | Murakami | H03K 17/0822 |
| | | | | 363/56.01 |
| 2016/0141730 | A1* | 5/2016 | Shin | H01M 50/20 |
| | | | | 429/7 |
| 2019/0379336 | A1* | 12/2019 | Takeuchi | G05F 3/24 |
| 2021/0234455 | A1* | 7/2021 | Endo | H02M 1/08 |

* cited by examiner

OVERCURRENT PROTECTIVE CIRCUIT AND DISPLAY PANEL

CROSS REFERENCE OF RELATED APPLICATION

This application is a U.S. national phase application based upon an International Application No. PCT/CN2019/094680, filed on Jul. 4, 2019, which claims the priority of Chinese Patent Application No. 201910349093.1, entitled "Overcurrent Protective Circuit and Display Panel", filed on Apr. 28, 2019, the disclosure of which is incorporated herein by reference in its entirety.

BACKGROUND

1. Field of the Disclosure

The present disclosure relates to the field of display, and more particularly, to an overcurrent protective circuit and a display panel.

2. Description of the Related Art

Nowadays, a display panel of a higher and higher driving frequency is realizing with a variety of frequencies are compatible. The greater the load voltage of a display panel is, the greater the threshold current of an overcurrent protective circuit for the display panel is greater.

However, to change the frequency of the power supply is necessary in practical applications and is quite frequent. The threshold current for the overcurrent protective circuit of the display panel is to meet the high threshold current at the high frequency. When a display panel at a high frequency becomes a display panel at a low frequency, the current at a low frequency threshold becomes too much. The display panel with a short circuit without detection results in the power supply overcurrent protective circuit failing to protect the display panel at a low frequency, which causes overheating of the display panel.

The overcurrent protective circuit in the display panel fails to protect the display panel at a low frequency, which is the main problem of the related art and needs to be resolved.

SUMMARY

An overcurrent protective circuit, a protection method, and a display panel are proposed by the present disclosure to deal with the problem of the related art that an overcurrent protective circuit fails to protect the display panel of the related art at a low frequency.

According to a first aspect of the present disclosure, an overcurrent protective circuit comprises:

a power supply circuit, configured to supply a voltage to the display panel;

a logic algorithm circuit, configured to calculate a threshold current of overcurrent protection of the display panel corresponding to the driving frequency according to different driving frequencies and feedback the calculated threshold current to the overcurrent protective circuit; and an overcurrent protective circuit, configured to adjust a protective component in the overcurrent protective circuit according to the amount of the threshold current, thereby protecting the overcurrent of the display panel.

Optionally, the logic algorithm circuit comprises a divider and a multiplier connected thereto.

Optionally, the overcurrent protective circuit comprises an internal memory module, a comparative circuit, and a switching transistor; the internal memory module is electrically connected to the logic algorithm circuit and deposit a threshold current calculated by the logic algorithm circuit; the comparative circuit comprises a reference voltage pin, a feedback voltage pin, and an output pin; the comparative circuit is configured to compare the amount of the feedback voltage and the amount of the reference voltage and control to turn on and off the switching transistor according to a comparative result.

Optionally, the overcurrent protective circuit is arranged inside a power-managed integrated circuit.

Optionally, the overcurrent protective circuit is arranged outside a power-managed integrated circuit.

Optionally, the resistor is arranged outside a power-managed integrated circuit; the internal memory module, the comparative circuit, and the switching transistor are arranged inside the power-managed integrated circuit.

Optionally, the resistor is a variable resistor.

Optionally, the resistor has a constant resistance.

According to a second aspect of the present disclosure, a display panel includes an overcurrent protective circuit. The overcurrent protective circuit includes:

a power supply circuit, configured to supply a voltage to the display panel;

a logic algorithm circuit, configured to calculate a threshold current of overcurrent protection of the display panel corresponding to the driving frequency according to different driving frequencies and feedback the calculated threshold current to the overcurrent protective circuit; and an overcurrent protective circuit, configured to adjust a protective component in the overcurrent protective circuit according to the amount of the threshold current, thereby protecting the overcurrent of the display panel.

Optionally, the logic algorithm circuit comprises a divider and a multiplier connected thereto.

Optionally, the overcurrent protective circuit comprises an internal memory module, a comparative circuit, and a switching transistor; the internal memory module is electrically connected to the logic algorithm circuit and deposit a threshold current calculated by the logic algorithm circuit; the comparative circuit comprises a reference voltage pin, a feedback voltage pin, and an output pin; the comparative circuit is configured to compare the amount of the feedback voltage and the amount of the reference voltage and control to turn on and off the switching transistor according to a comparative result.

Optionally, the overcurrent protective circuit is arranged inside a power-managed integrated circuit.

Optionally, the overcurrent protective circuit is arranged outside a power-managed integrated circuit.

Optionally, the resistor is arranged outside a power-managed integrated circuit; the internal memory module, the comparative circuit, and the switching transistor are arranged inside the power-managed integrated circuit.

Optionally, the resistor is a variable resistor.

Optionally, the resistor has a constant resistance.

According to a third aspect of the present disclosure, a method of protecting an overcurrent protective circuit includes:

obtaining a driving frequency;

calculating a threshold current at the driving frequency with a logic algorithm circuit according to the driving frequency;

adjusting a feedback voltage applied on a feedback voltage pin or a resistor in an overcurrent protective circuit based on the amount of the threshold current to adjust a feedback voltage applied on the overcurrent protective circuit;

comparing the feedback voltage with the reference voltage, and controlling a switching transistor to be turned on and off according to a comparative result.

Optionally, the step of calculating the obtained threshold current at the driving frequency based on the driving frequency with the logic algorithm circuit comprises steps of:

dividing the threshold current at the original frequency by an original frequency and calculating the threshold current at a single frequency with a divider;

multiplying the threshold current at the single frequency by the new frequency and calculating the threshold current with the new frequency with a multiplier.

Optionally, the step of adjusting a feedback voltage applied on a feedback voltage pin or a resistor in an overcurrent protective circuit based on the amount of the threshold current to adjust a feedback voltage applied on the overcurrent protective circuit comprises steps of;

obtaining and storing the threshold current at the new frequency which is calculated by the logic algorithm circuit with a memory module;

adjusting the resistor or directly adjusting the feedback voltage pin to obtain a feedback voltage which matches the reference voltage.

Optionally, the step of comparing the feedback voltage with the reference voltage and controlling the switching transistor to be turned on and off according to the comparative result comprises a step of:

comparing the feedback voltage with the reference voltage; if the feedback voltage is greater than the reference voltage, turning off the switching transistor; if the feedback voltage is less than the reference voltage, turning on the switching transistor.

The present disclosure proposes an overcurrent protective circuit and a display panel. The overcurrent protective circuit includes a power supply circuit, a logic algorithm circuit, and an overcurrent protective circuit. The logic algorithm circuit is additionally arranged in the overcurrent protective circuit. The logic algorithm circuit set different threshold currents of overcurrent protection for the display panel according on different driving frequencies. The overcurrent protective circuit adjusts the protective components inside the overcurrent protective circuit in accordance with the set threshold currents. Therefore, the display panel is protected by the overcurrent protective circuit at different frequencies. The problem of the related art as mentioned above that the display panel overcurrent protective circuit fails to protect the display panel is well resolved.

BRIEF DESCRIPTION OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF THE EMBODIMENTS

Figure 1:
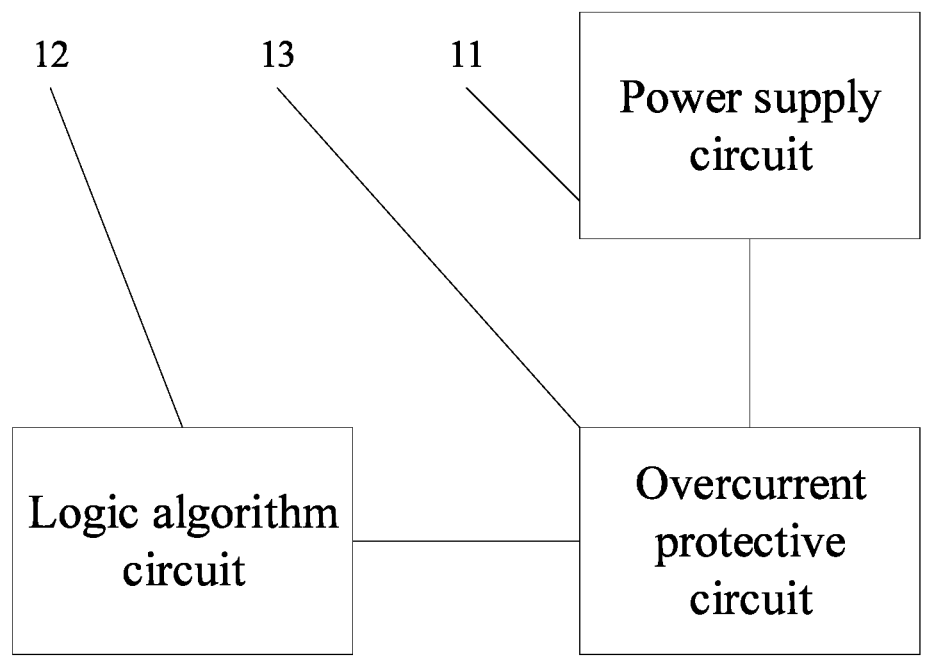
FIG. 1 illustrates a block diagram of an overcurrent protective circuit according to an embodiment of the present disclosure.

In the description of the present disclosure, it should be understood that terms such as "center," "longitudinal," "lateral," "length," "width," "thickness," "upper," "lower," "front," "rear," "left," "right," "vertical," "horizontal," "top," "bottom," "inside," "outside," "clockwise," "counterclockwise" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

An overcurrent protective circuit is proposed by the present disclosure to manage to resolve the problem of the related art that an overcurrent protective circuit fails to protect the display panel of the related art at a low frequency.

As FIG. 1 illustrates, the present disclosure provides an overcurrent protective circuit comprises a power supply circuit 11, a logic algorithm circuit 12, and an overcurrent protective circuit 13.

The power supply circuit 11 is configured to supply voltage to the display panel.

The logic algorithm circuit 12 is configured to calculate the threshold current of the overcurrent protection corresponding to a driving frequency depending on the driving frequency and feedback the calculated threshold current to the overcurrent protective circuit.

The overcurrent protective circuit 13 is configured to adjust protective components in the overcurrent protective circuit based on the amount of the threshold current to protect the overcurrent of the display panel.

The present disclosure proposes the overcurrent protective circuit. The overcurrent protective circuit includes the power supply circuit, the logic algorithm circuit, and the overcurrent protective circuit. The logic algorithm circuit is additionally arranged in the overcurrent protective circuit. The logic algorithm circuit set different threshold currents of overcurrent protection for the display panel according on different driving frequencies. The overcurrent protective circuit adjusts the protective components inside the overcurrent protective circuit in accordance with the set threshold currents. Therefore, the display panel is protected by the overcurrent protective circuit at different frequencies. The problem of the related art as mentioned above that the display panel overcurrent protective circuit fails to protect the display panel is well resolved.

Figure 2:
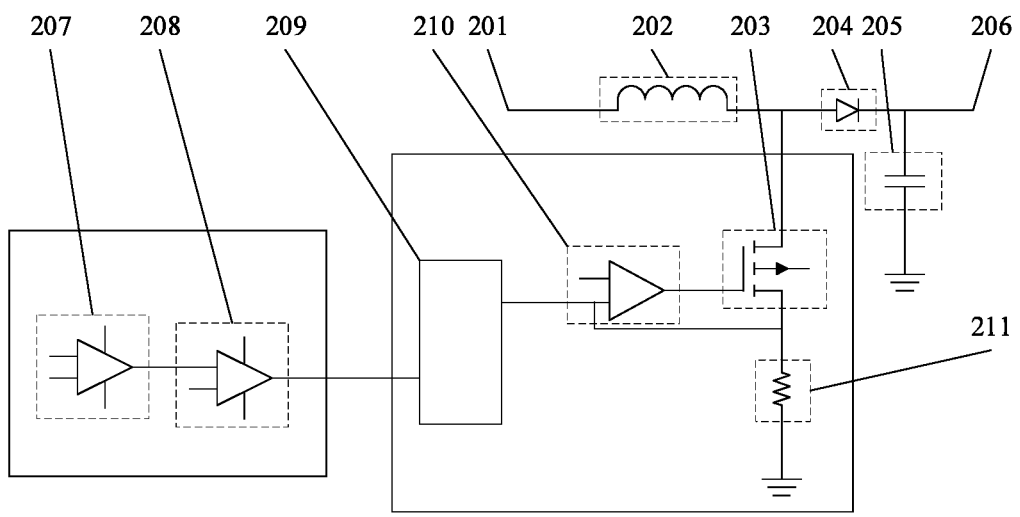
FIG. 2 illustrates a circuit diagram of the overcurrent protective circuit according to an embodiment of the present disclosure.

As FIG. 2 illustrates, the power supply circuit 11 includes an input voltage terminal 201, an inductor 202, a switching transistor 203, a diode 204, a capacitor 205, an output voltage terminal 206, and a power supply circuit 11. The power supply circuit 11 is configured to supply a voltage to the display panel.

The input voltage is input to the input voltage terminal 201. The inductor 202 and the switching transistor 203 achieve voltage conversion. When the switching transistor 203 is turned on, the inductor 202 converts the electrical energy into magnetic energy for storage. When the switching transistor 203 is turn off, the inductor 202 converts the stored magnetic field energy into the electric field energy for output. The electric field energy can be superimposed with the input voltage from the input voltage terminal 201. The superimposed voltage forms a stable voltage after being rectified and filtered by the diode 204 and the capacitor 205. Finally, the stable voltage is output to the display panel through the output voltage terminal 206.

When the input voltage is constant, the output voltage is determined by the duty cycle of the switching transistor 203. The duty cycle of the switching transistor 203 indicates the cycle of operation of the switching transistor 203. The greater the duty cycle is, the greater the output voltage is. The less the duty cycle is, the less the output voltage becomes.

As FIG. 2 illustrates, the logic algorithm circuit 12 is typically arranged within the timing control circuit. The logic algorithm circuit 12 includes a divider 207 and a multiplier 208. The divider 207 and the multiplier 208 are connected to each other. The logic algorithm circuit 12 is configured to calculate the threshold current of the overcurrent protection corresponding to the driving frequency depending on the driving frequency and feedback the calculated threshold current to the overcurrent protective circuit 13.

The divider 207 is configured to divide the value of the threshold current at the original drive frequency to obtain the value of the threshold current at a single frequency. The multiplier 208 is configured to multiply the threshold current value by the new number of frequencies under a single frequency to obtain the threshold current at the new frequency. The threshold current at the new frequency is transmitted to the overcurrent protective circuit 13 through an integrated circuit bus.

As FIG. 2 illustrates, the overcurrent protective circuit 13 is typically arranged within the power-managed integrated circuit. The overcurrent protective circuit 13 includes an internal memory module 209, a comparative circuit, and a switching transistor 203. The overcurrent protective circuit 13 is configured to adjust protective components in the overcurrent protective circuit 13 according to the amount of the threshold current, thereby protecting the overcurrent through the display panel.

As FIG. 2 illustrates, the internal memory module 209 is electrically connected to the logic algorithm circuit 12 and deposit the threshold current calculated by the logic algorithm circuit.

Figure 3:
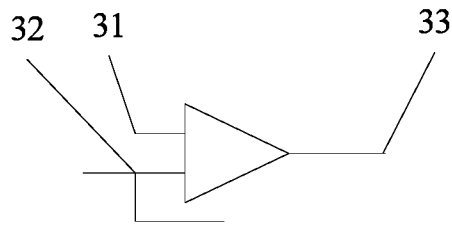
FIG. 3 illustrates a circuit diagram of a comparative circuit of the overcurrent protective circuit according to an embodiment of the present disclosure.

As FIG. 3 illustrates, the comparative circuit includes a reference voltage pin 31, a feedback voltage pin 32, and an output pin 33. The output pin 33 is electrically connected to a gate of the switching transistor 203. The comparative circuit is configured to compare the amount of the feedback voltage and the amount of the reference voltage and control to turn on and off the switching transistor 203 according to the comparative result.

As FIG. 2 illustrates, a drain of the switching transistor 203 is electrically connected to one terminal of the inductor 202 and a positive terminal of the diode 204. The switching transistor 203 is used to be turned on and off to protect the display panel.

As FIG. 2 and FIG. 3 illustrate, the equivalent adjustment module is configured to convert the threshold current into the threshold voltage that is matched to the reference voltage, and adjust voltage applied on the feedback voltage pin 32 or the resistor 211 according to the threshold voltage and the threshold current, thereby adjusting the amount of the feedback voltage.

The overcurrent protective circuit 13 is arranged inside the power-managed integrated circuit. The resistor 211 is a resistor with a fixed value which is not adjustable.

The overcurrent protective circuit 13 is arranged outside the power-managed integrated circuit. The resistor 211 may be a resistor with a fixed value or a variable resistor. The resistance of the resistor 211 with a fixed value is not adjustable. The resistance of the resistor 211 can be adjusted as needed upon a condition that the resistor 211 is a variable resistor.

The resistor 211 is arranged outside a power-managed IC. The resistor 211 may be a resistor with a fixed value or with digital adjustment. The resistance of the resistor 211 with a fixed value is not adjustable. The resistance of the resistor 211 with digital adjustment can be adjusted as needed.

Figure 4:
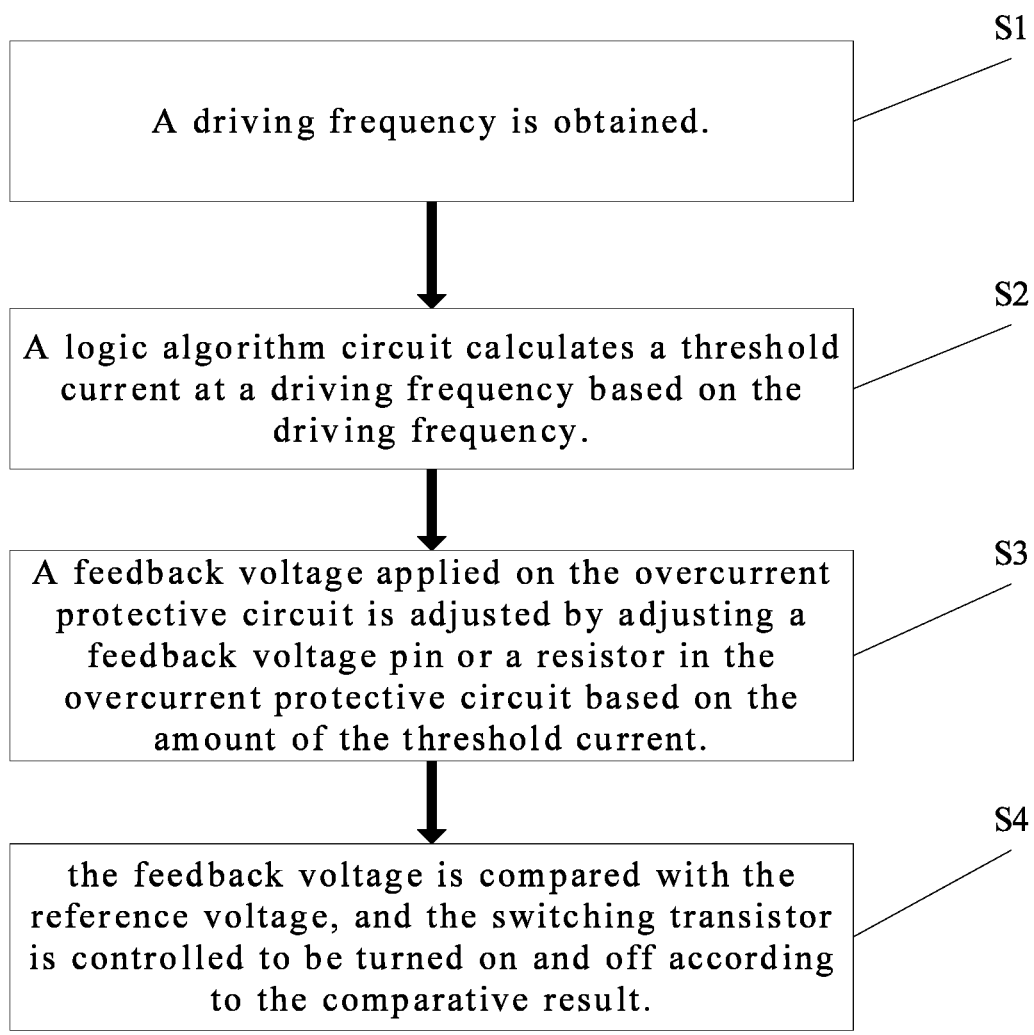
FIG. 4 illustrates a flowchart of a method of protecting an overcurrent protective circuit according to an embodiment of the present disclosure.

As FIG. 4 illustrates, a method of protecting an overcurrent protective circuit is proposed by the present disclosure. The method includes Block S1, Block S2, Block 3, and Block 4.

At Block S1, a driving frequency is obtained.

At Block S2, a logic algorithm circuit 12 is configured to calculate the threshold current at a driving frequency based on the driving frequency.

At Block S3, a feedback voltage applied on the overcurrent protective circuit 13 is adjusted by adjusting a feedback voltage pin 32 or a resistor 211 in the overcurrent protective circuit 13 based on the amount of the threshold current.

At Block S4, the feedback voltage is compared with the reference voltage, and the switching transistor 203 is controlled to be turned on and off according to the comparative result.

The block of calculating the obtained threshold current at the driving frequency based on the driving frequency with the logic algorithm circuit 12 includes steps of:

dividing the threshold current at the original frequency by the original frequency and calculating the threshold current at a single frequency with a divider 207;

multiplying the threshold current at the single frequency by the new frequency and calculating the threshold current with the new frequency with a multiplier 208.

The block of adjusting the feedback voltage pin 32 or the resistor 211 in the overcurrent protective circuit 13 based on the amount of the threshold current, thereby adjusting the feedback voltage applied on the overcurrent protective circuit 13 includes steps of:

obtaining and depositing the threshold current at the new frequency which is calculated by the logic algorithm circuit 12 with a memory module 209.

adjusting the resistor 211 or directly adjusting the feedback voltage pin 32 to obtain a feedback voltage which matches the reference voltage.

In another embodiment, a step of directly adjusting a feedback voltage pin 32 to obtain a feedback voltage which matches a reference voltage. includes steps of:

an equivalent feedback voltage is directly input to a feedback voltage pin 32 to adjust the feedback voltage which matches the reference voltage.

In another embodiment, a step of adjusting the resistor 211 to obtain a feedback voltage which matches a reference voltage includes steps of:

dividing the feedback voltage by the threshold current value to obtain a new resistance. A digital adjustable resistor with the new resistance is set, thereby adjusting the feedback voltage applied on a comparative circuit and a feedback voltage which matches the reference voltage.

In another embodiment, a step of comparing a feedback voltage with a reference voltage and controlling the switching transistor 203 to be turned on and off according to the comparative result includes steps of:

comparing a feedback voltage with a reference voltage; if the feedback voltage is less than the reference voltage, an output pin 33 outputting a high voltage to turn on a switching transistor 203;

if the feedback voltage is greater than the reference voltage, the output pin 33 outputting a low voltage to turn off the switching transistor 203 to reduce the duty cycle of the switching transistor 203, thereby reducing the voltage of the output voltage terminal 206.

Further, a display panel including an overcurrent protective circuit is also provided. The overcurrent protective circuit includes:

a power supply circuit, configured to supply a voltage to the display panel;

a logic algorithm circuit, configured to calculate a threshold current of overcurrent protection of the display panel corresponding to the driving frequency according to different driving frequencies and feedback the calculated threshold current to the overcurrent protective circuit; and an overcurrent protective circuit, configured to adjust a protective component in the overcurrent protective circuit according to the amount of the threshold current, thereby protecting the overcurrent of the display panel.

The working principle of the display panel is similar to the working principle of the above overcurrent protective circuit so the details related to the display panel are skipped.

The present disclosure proposes a display panel having an overcurrent protective circuit. The overcurrent protective circuit includes a power supply circuit, a logic algorithm circuit, and an overcurrent protective circuit. The logic algorithm circuit is additionally arranged in the overcurrent protective circuit. The logic algorithm circuit set different threshold currents of overcurrent protection for the display panel according on different driving frequencies. The overcurrent protective circuit adjusts the protective components inside the overcurrent protective circuit in accordance with the set threshold currents. Therefore, the display panel is protected by the overcurrent protective circuit at different frequencies. The problem of the related art as mentioned above that the display panel overcurrent protective circuit fails to protect the display panel is well resolved.

To sum up, the present disclosure proposes an overcurrent protective circuit and a display panel. The overcurrent protective circuit includes a power supply circuit, a logic algorithm circuit, and an overcurrent protective circuit. The logic algorithm circuit is additionally arranged in the overcurrent protective circuit. The logic algorithm circuit set different threshold currents of overcurrent protection for the display panel according on different driving frequencies. The overcurrent protective circuit adjusts the protective components inside the overcurrent protective circuit in accordance with the set threshold currents. Therefore, the display panel is protected by the overcurrent protective circuit at different frequencies. The problem of the related art as mentioned above that the display panel overcurrent protective circuit fails to protect the display panel is well resolved.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. An overcurrent protective circuit, comprising:
    a power supply circuit, configured to supply a voltage to the display panel;
    a logic algorithm circuit, configured to calculate a threshold current of overcurrent protection of the display panel corresponding to the driving frequency according to different driving frequencies and feedback the calculated threshold current to the overcurrent protective circuit; and
    an overcurrent protective circuit, configured to adjust a protective component in the overcurrent protective circuit according to the amount of the threshold current, thereby protecting the overcurrent of the display panel.

2. The overcurrent protective circuit according to claim 1, wherein the logic algorithm circuit comprises a divider and a multiplier connected thereto.

3. The overcurrent protective circuit according to claim 1, wherein the overcurrent protective circuit comprises an internal memory module, a comparative circuit, and a switching transistor; the internal memory module is electrically connected to the logic algorithm circuit and deposit a threshold current calculated by the logic algorithm circuit; the comparative circuit comprises a reference voltage pin, a feedback voltage pin, and an output pin; the comparative circuit is configured to compare the amount of the feedback voltage and the amount of the reference voltage and control to turn on and off the switching transistor according to a comparative result.

4. The overcurrent protective circuit according to claim 3, wherein the overcurrent protective circuit is arranged inside a power-managed integrated circuit.

5. The overcurrent protective circuit according to claim 3, wherein the overcurrent protective circuit is arranged outside a power-managed integrated circuit.

6. The overcurrent protective circuit according to claim 3, wherein a resistor is arranged outside a power-managed integrated circuit; the internal memory module, the comparative circuit, and the switching transistor are arranged inside the power-managed integrated circuit.

7. The overcurrent protective circuit according to claim 6, wherein the resistor is a variable resistor.

8. The overcurrent protective circuit according to claim 6, wherein the resistor has a constant resistance.

9. A display panel, comprising an overcurrent protective circuit, the overcurrent protective circuit comprising:
    a power supply circuit, configured to supply a voltage to the display panel;
    a logic algorithm circuit, configured to calculate a threshold current of overcurrent protection of the display panel corresponding to the driving frequency according to different driving frequencies and feedback the calculated threshold current to the overcurrent protective circuit; and
    an overcurrent protective circuit, configured to adjust a protective component in the overcurrent protective circuit according to the amount of the threshold current, thereby protecting the overcurrent of the display panel.

10. The display panel according to claim 9, wherein the logic algorithm circuit comprises a divider and a multiplier connected thereto.

11. The display panel according to claim 9, wherein the overcurrent protective circuit comprises an internal memory module, a comparative circuit, and a switching transistor; the internal memory module is electrically connected to the logic algorithm circuit and deposit a threshold current calculated by the logic algorithm circuit; the comparative circuit comprises a reference voltage pin, a feedback voltage pin, and an output pin; the comparative circuit is configured to compare the amount of the feedback voltage and the amount of the reference voltage and control to turn on and off the switching transistor according to a comparative result.

12. The display panel according to claim 11, wherein the overcurrent protective circuit is arranged inside a power-managed integrated circuit.

13. The display panel according to claim 11, wherein the overcurrent protective circuit is arranged outside a power-managed integrated circuit.

14. The display panel according to claim 11, wherein a resistor is arranged outside a power-managed integrated circuit; the internal memory module, the comparative circuit, and the switching transistor are arranged inside the power-managed integrated circuit.

15. The display panel according to claim 14, wherein the resistor has a constant resistance.

16. The display panel according to claim 14, wherein the resistor is a variable resistor.

17. A method of protecting an overcurrent protective circuit, comprising:
   obtaining a driving frequency;
   calculating a threshold current at the driving frequency with a logic algorithm circuit according to the driving frequency;
   adjusting a feedback voltage applied on a feedback voltage pin or a resistor in an overcurrent protective circuit based on the amount of the threshold current to adjust a feedback voltage applied on the overcurrent protective circuit;
   comparing the feedback voltage with the reference voltage, and controlling a switching transistor to be turned on and off according to a comparative result.

18. The method according to claim 17, wherein the step of calculating the obtained threshold current at the driving frequency based on the driving frequency with the logic algorithm circuit comprises steps of:
   dividing the threshold current at the original frequency by an original frequency and calculating the threshold current at a single frequency with a divider;
   multiplying the threshold current at the single frequency by the new frequency and calculating the threshold current with the new frequency with a multiplier.

19. The method according to claim 17, wherein the step of adjusting a feedback voltage applied on a feedback voltage pin or a resistor in an overcurrent protective circuit based on the amount of the threshold current to adjust a feedback voltage applied on the overcurrent protective circuit comprises steps of;
   obtaining and storing the threshold current at the new frequency which is calculated by the logic algorithm circuit with a memory module;
   adjusting the resistor or directly adjusting the feedback voltage pin to obtain a feedback voltage which matches the reference voltage.

20. The method according to claim 17, wherein the step of comparing the feedback voltage with the reference voltage and controlling the switching transistor to be turned on and off according to the comparative result comprises a step of:
   comparing the feedback voltage with the reference voltage; if the feedback voltage is greater than the reference voltage, turning off the switching transistor; if the feedback voltage is less than the reference voltage, turning on the switching transistor.

* * * * *